United States Patent [19]
Martin et al.

[11] Patent Number: 4,546,861
[45] Date of Patent: Oct. 15, 1985

[54] AUTOMATIC ADJUSTER FOR SHOE-DRUM BRAKE

[75] Inventors: Timothy J. Martin, Solihull; Bernard T. Page, Shirley; Francis H. A. Hooper, Coventry, all of England

[73] Assignee: Lucas Industries Public Limited Company, Birmingham, England

[21] Appl. No.: 492,608

[22] Filed: May 9, 1983

[30] Foreign Application Priority Data

May 17, 1982 [GB] United Kingdom ............... 8214305

[51] Int. Cl.[4] .................................... F16D 65/56
[52] U.S. Cl. ..................... 188/79.5 GE; 188/79.5 GT; 188/196 R; 188/196 D; 92/111 A
[58] Field of Search ..................... 188/196, 79.5, 71.9, 188/71.8; 192/111 A

[56] References Cited

U.S. PATENT DOCUMENTS

| | | | |
|---|---|---|---|
| 3,952,845 | 4/1976 | Asquith | 188/196 D |
| 4,094,390 | 6/1978 | Neuman | 188/196 D |

FOREIGN PATENT DOCUMENTS

2058258  4/1981  United Kingdom ........... 188/196 D

Primary Examiner—Douglas C. Butler
Attorney, Agent, or Firm—Holman & Stern

[57] ABSTRACT

An automatic adjuster includes a pair of threadedly interengaged parts forming an extensible strut and a restraint device in the form of a washer locked to a head on one part and having a projecting tongue which, when the parts are near to their limit of retraction, engages in a groove of the other part to prevent relative rotation of the parts and thereby precludes engagement between respective potentially jamming adjacent surfaces of the parts.

5 Claims, 5 Drawing Figures

AUTOMATIC ADJUSTER FOR SHOE-DRUM BRAKE

BACKGROUND OF THE INVENTION

1. Field of the Invention

This invention relates to an automatic adjuster for a shoe-drum brake, primarily for use on a motor vehicle, the adjuster incorporating a strut of variable length which includes a pair of threadedly interengaged parts, relative rotation between which causes the strut length to vary so as to effect adjustment of the retracted positions of one or more brake shoes with which the strut is operatively associated in use.

2. Description of the Prior Art

In some adjusters of this kind, it is possible for opposed surfaces of the strut parts to be forced into engagement by the screw action of the parts, resulting in jamming of the adjuster when said parts are at an extremity of their adjusting travel, which can prevent subsequent automatic operation of the adjuster. This can happen, for example, when the adjuster is retracted manually during servicing of the brake in order to facilitate removal of the brake drum. When this happens, there is a risk of neglecting to free the jammed adjuster parts during re-assembly of the brake and the brake consequently not achieving an optimum operational condition.

BRIEF SUMMARY OF THE INVENTION

An object of the present invention is to provide an automatic adjuster for a shoe drum brake in which the aforesaid problem is minimized or avoided.

According to the invention, an automatic adjuster comprises a strut of variable length which includes a pair of threadedly interengaged parts, relative rotation between which causes the strut length to vary so as to effect adjustment of the retracted positions of one or more brake shoes with which the strut is operatively associated in use, restraint means being provided which co-operate to limit relative rotation of the parts when the latter are near to an extremity of adjusting movement so as to prevent engagement of a surface of at least one of the parts with an adjacent opposed surface, but which otherwise permit unrestricted relative rotation of the parts.

Preferably, the restraint means are carried respectively by the adjuster parts and may conveniently be arranged so that circumferentially facing portions thereof are brought into abutment when the parts are near to said extremity of adjusting movement to prevent engagement of said surfaces.

In one typical practical arrangement in which said surfaces are respectively on the adjuster parts, the restraint means are pins respectively projecting axially from said parts in opposed directions, the lengths of the pins being such, in relation to the screw thread pitch of the parts, that the pins overlap axially just prior to engagement of said surfaces so that circumferentially facing portions of the pins are brought into mutual abutment in order to prevent further relative rotation of said parts and thereby preclude engagement of said opposed surfaces on the parts.

The restraint means in an alternative practical embodiment includes a retaining device carried by one of the parts in non-rotatable manner and a slot in the other part, the device having a resilient tongue arranged to be resiliently deformed as said surfaces approach mutual engagement by relative rotation of the parts in one direction, the slot being disposed to receive the tongue upon resilient recovery of the latter when the tongue and slot come into registration, so as to lock the parts against further rotation in said one direction.

BRIEF DESCRIPTION OF THE DRAWINGS

The invention will now be described, by way of example, with reference to the accompanying drawings wherein.

DETAILED DESCRIPTION

Figure 1:
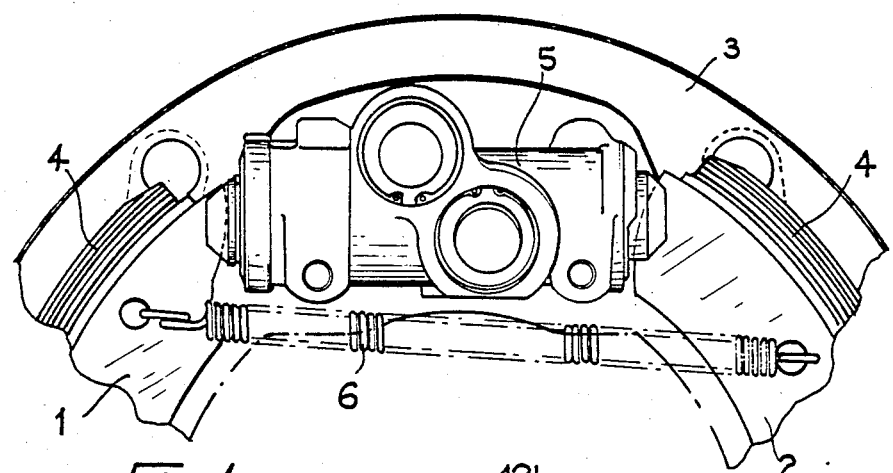
FIG. 1 is an elevational view of part of a vehicle internal shoe drum brake.

Referring to FIG. 1, the shoe-drum brake illustrated therein has a pair of arcuate shoes 1 and 2 mounted on a back plate 3, each shoe having a friction lining 4 for engagement with a rotatable drum (not shown). The brake incorporates an actuator 5 between one adjacent pair of shoe ends, the actuator being operable to urge the shoes outwardly into braking engagement with the drum against the action of an adjacent return spring 6.

Figure 2:
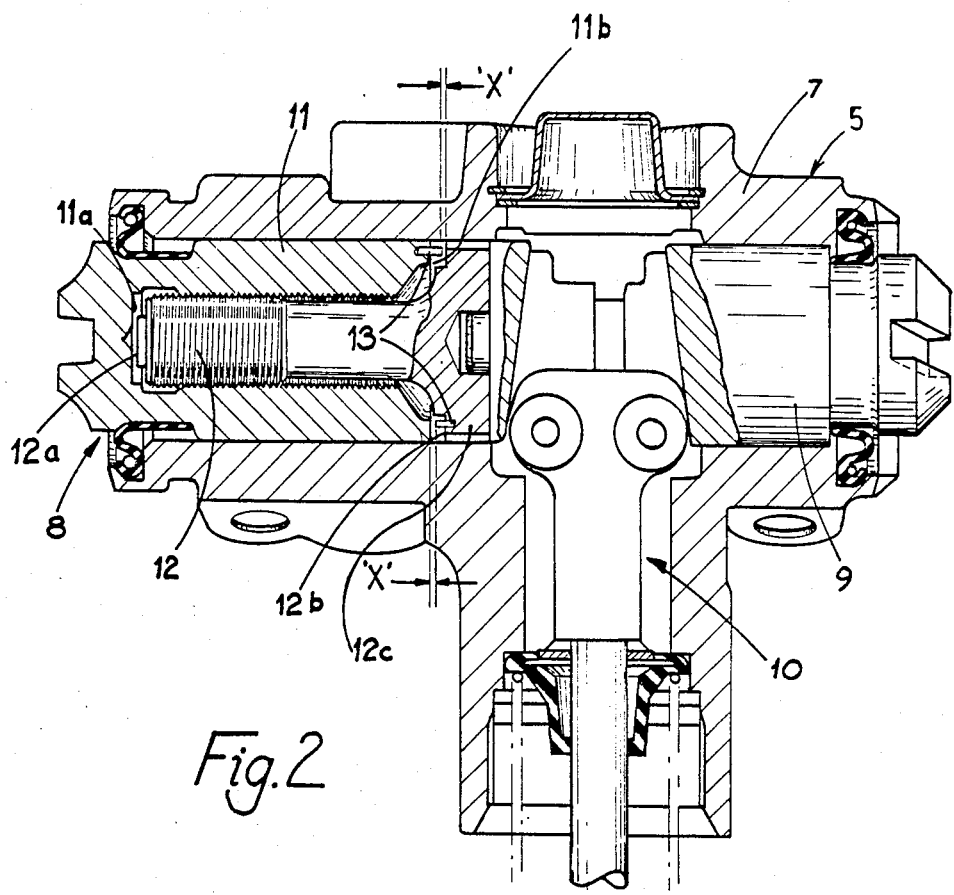
FIG. 2 is a longitudinal cross-sectional view through one form of actuator for use in the brake of FIG. 1.
Figure 3:
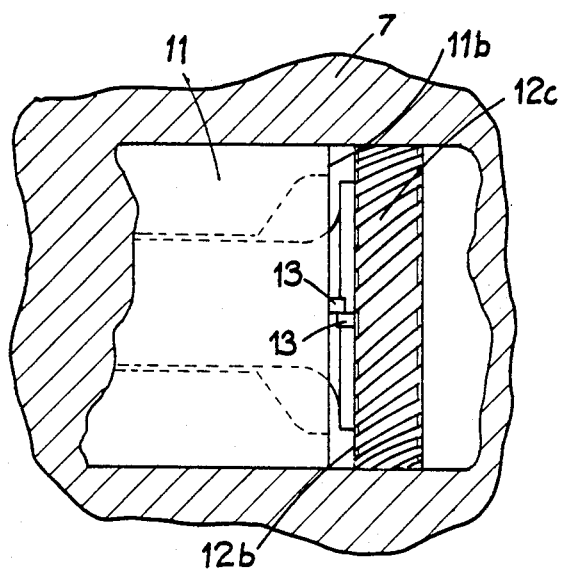
FIG. 3 is a fragmentary cross-sectional view, partly broken away, of part of the actuator of FIG. 2 showing components thereof in alternative positions.

One possible form of actuator 5 is illustrated in FIG. 2 and includes a housing 7 adapted to be fixed to the back plate 3, the housing containing a pair of tappets 8 and 9 for engagement with the shoes 1 and 2 respectively in conventional manner, the tappets being separable by means of a wedge actuator indicated generally at 10 so as to urge the shoes into braking engagement with the drum. The tappet 8 includes an outer sleeve 11 having an axial threaded bore into which is screwed a threaded spigot 12 forming a strut of variable length which is part of an automatic adjuster mechanism. As will be well understood by those versed in the art, the spigot 12 is rotatable by one of a variety of means incorporated in the adjuster mechanism, in response to excess shoe movement, and this has the effect of screwing the sleeve 11 outwardly to adjust the retracted position of the shoe engaged therewith. It will be understood that an adjuster may also be incorporated in the tappet 9, and this will be assumed to be of a similar nature for the purposes of the present invention, although it may take different forms according to requirements.

In a conventional adjuster having a sleeve 11 and spigot 12 arranged in the manner illustrated, it is possible during retraction of the strut, for example when the shoes are removed for servicing, for the spigot to be wound into the sleeve to such an extent that the end 12a of the spigot 12 engages the internal end wall 11a of the sleeve 11 and may result in sufficient resistance being set-up in the threads of the sleeve and spigot to jam the spigot in that position, thereby preventing subsequent operation of the adjuster. A similar condition would arise by jamming between the inner end surface 11b of the sleeve and the rear surface 12b of an enlarged head 12c of the spigot. In order to prevent this happening, the sleeve and spigot are provided with restraint means in the form of respective axially projecting pins 13, the lengths of which are chosen in relation to the screw thread pitch such that they come into axially overlapping relationship just before the faces 11a and 12a or 11b and 12b come into engagement, whereby circumferentially facing parts of the pins abut each other to prevent further relative rotation between the sleeve 11 and spigot 12. Engagement of the aforesaid surfaces is thus prevented and reverse relative rotation between the sleeve and spigot may readily be effected to increase the length of the strut when desired. It will be understood that, with the pins in diametrically opposed locations is illustrated, the distance 'X' from the end of either pin to the opposing face of the sleeve or head 12c respectively must be just greater than half the pitch of the threads between the sleeve and spigot.

Figure 4:
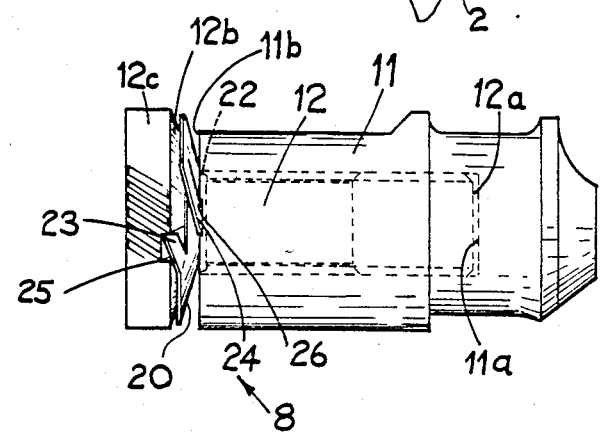
FIG. 4 is an elevational view of a pair of threadedly inter-engaged parts of an alternative form of the adjuster of the invention.
Figure 5:
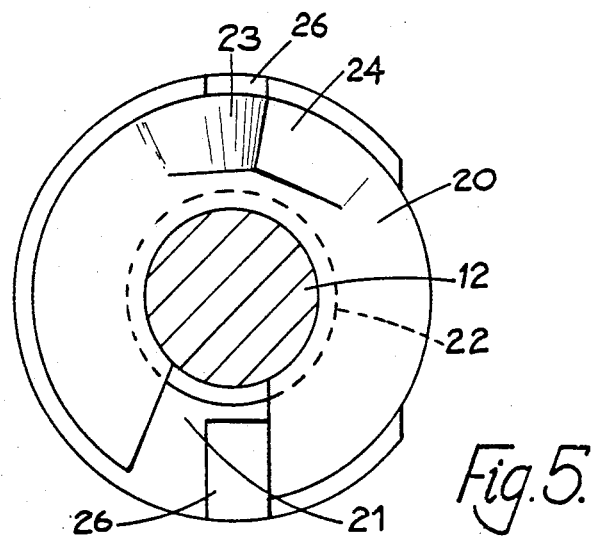
FIG. 5 is a partly cross-sectional end view of FIG. 4 in the direction of arrow A with part thereof removed.

A further alternative embodiment is illustrated in FIGS. 4 and 5. FIG. 4 illustrates a tappet 8 formed by a pair of components one being an internally threaded sleeve 11 which receives a threaded spigot 12 therein in similar manner to the tappet 8 of FIG. 2. The restraint means in this embodiment is in the form of a generally circular washer 20 having a generally radial slot 21 of such dimensions as to permit the washer to be passed closely over the spigot in a generally radial direction behind a rib 22 formed on the spigot to provide axial retention. The rib 22 may alternatively be formed by a groove to receive an edge portion of the washer and again provide axial retention. The washer is provided with a pair of resilient tongues 23 and 24 projecting in opposite directions out of the plane thereof, the tongue 23 being engaged in a slot 25 in the spigot head 12c under some resilient compression, thereby to provide positive circumferential location of the washer, assisted by friction between the sides of the slot 21 and the spigot. The tongue 24 extends out of the plane of the washer in a direction towards the opposed face 11b of the sleeve 11, in which face is formed a pair of diammetrically opposed slots 26. The outward extent of the tongue 24 is so chosen in relation to the pitch of the screw thread between the components 11 and 12 that, as opposed surfaces of these components, such as 11a and 12a approach mutual engagement during retraction of the strut, the tongue 24 engages the face 11b of the sleeve 11 and is resiliently deformed away from that surface as the spigot is screwed further into the sleeve. When the tongue 24 comes into register with one of the sots 26, it will now be subject to some inherent resilient force which will urge the tongue into the slot 26 so that engagement of the tongue with a side of the slot will prevent further relative rotation between the components in a direction which would lead to mutual engagement of said opposed surfaces thereof. Upon reverse rotation, the inclined face of the tongue opposed to the face 11b of the sleeve 11 rides up the edge of the slot until the tongue is disengaged from the slot, whereupon the spigot may be readily wound outwardly of the sleeve to a desired position.

It will be seen that the various forms of restraint means illustrated overcome the problem found in some conventional adjusters of potential jamming by engagement of opposed faces of the threadedly interengaged adjuster components. The shapes and arrangement of pins 11 and of the washer 16 may be varied as desired, the only essential being the prevention of relative rotation between the adjuster components to the extent that opposed respective surfaces thereof come into jamming engagement.

In some adjusters, it may be possible for jamming to occur between a rotatable part of the strut and an adjuster part not forming part of the strut, such as the adjuster body. In such a case, it would still be possible to provide restraint means on said rotatable part and said adjuster part to prevent engagement of potentially jamming surfaces, in similar manner to those described above.

We claim:

1. An automatic adjuster comprising:
 a variable length strut including a pair of screw threadedly interengaged adjuster parts operatively engageable in use with at least one brake shoe so that relative rotation between said parts varies the length of said strut to effect adjustment of retracted positions of said at least one brake shoe; and
 restraint pins respectively projecting axially from said parts in opposite directions and having circumferentially facing portions and lengths in relation to the pitch of the interengaged screw threads of said parts so that said circumferentially facing portions are engageable in mutual abutting relationship to prevent relative rotation in one direction of said parts when said parts are near an extremity of adjusting movement to preclude engagement of a surface of at least one of said parts with an adjacent opposed surface, but otherwise permit unrestricted relative rotation of said parts.

2. An automatic adjuster comprising:
 a variable length strut including a pair of screw threadedly interengaged adjuster parts operatively engageable in use with at least one brake shoe so that relative rotation between said parts varies the length of said strut to effect adjustment of retracted positions of said at least one brake shoe, at least one of said parts having a surface which when said parts are near an extremity of adjusting movement approaches mutual engagement with an opposed surface;
 a restraint device non-rotatably mounted on one of said parts;
 a resilient tongue on said retaining device adapted to be resiliently deformed as said surfaces approach said mutual engagement by relative rotation of said parts in one direction; and
 a slot in the other of said parts disposed to register with and receive said tongue upon resilient recovery thereof when said parts are near said extremity of adjusting movement to lock said parts against further relative rotation in said one direction and prevent mutual engagement of said surfaces, but otherwise permit unrestricted relative rotation of said parts.

3. An adjuster as claimed in claim 2 wherein:
 said restraint device comprises a resilient annular washer; a pair of resilient tongues projecting in opposite directions out of the plane of said member, one of said tongues being said tongue engageable in said slot in the other of said parts; a recess in an adjacent surface of said one of said parts; and said other tongue being operatively engageable in said recess to locate said washer circumferentially.

4. An adjuster as claimed in claim 3 wherein:
 said one of said parts comprises a spigot; and further comprising
 a rib on said spigot; and
 a substantially radial slot in said annular washer to facilitate inserting said washer onto said spigot adjacent said rib to axially retain said washer on said spigot.

5. An automatic adjuster comprising:

a variable length strut including a pair of screw threadedly interengaged adjuster parts operatively engageable in use with at least one brake shoe so that relative rotation between said parts varies the length of said strut to effect adjustment of retracted positions of said at least one brake shoe, at least one of said parts having a surface which when said parts are near an extremity of adjusting movement approaches mutual engagement with an opposed axially facing surface;

restraint means mounted respectively on said parts; and circumferentially facing portions on said restraint means engageable in mutual abutting relationship to prevent relative rotation in one direction of said parts when said parts are near said extremity of adjusting movement and thereby prevent mutual engagement of said surfaces, but otherwise permit unrestricted relative rotation of said parts.

* * * * *